United States Patent
Mostafa

(10) Patent No.: US 6,373,422 B1
(45) Date of Patent: Apr. 16, 2002

(54) METHOD AND APPARATUS EMPLOYING DECIMATION FILTER FOR DOWN CONVERSION IN A RECEIVER

(75) Inventor: Mohamed A. Mostafa, College Station, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/697,190

(22) Filed: Oct. 26, 2000

(51) Int. Cl.$^7$ ................................................. H03M 1/12
(52) U.S. Cl. ....................................................... 341/155
(58) Field of Search ................................. 341/155, 126, 341/156, 165, 172

(56) References Cited

U.S. PATENT DOCUMENTS 5,745,394 A * 4/1998 Tani ............................ 341/155

* cited by examiner

Primary Examiner—Brian Young
(74) Attorney, Agent, or Firm—Pedro P. Hernandez; W. James Brady, III; Frederick J. Telecky, Jr.

(57) ABSTRACT

A radio frequency receiver includes a mixer (508) for converting a radio frequency signal into an IF signal. The IF signal is then filtered and amplified by a filter (510) and automatic gain control circuit (512). The filtered and amplified IF signal is then received by an analog-to-digital converter (514) in order to convert the signal from an analog signal into a digital signal. The digital signal is then provided to a decimation filter (516) in order to convert the digital signal into a base band signal (520). The ADC (514) and decimation filter (516) both are provided with a sampling frequency signal (518) which is preferably at least four times greater than the IF signal. By using a decimation filter (516) the need for a second down conversion mixer is eliminated, thereby eliminating any associated noise, power consumption and distortion associated with using a second mixer.

10 Claims, 2 Drawing Sheets

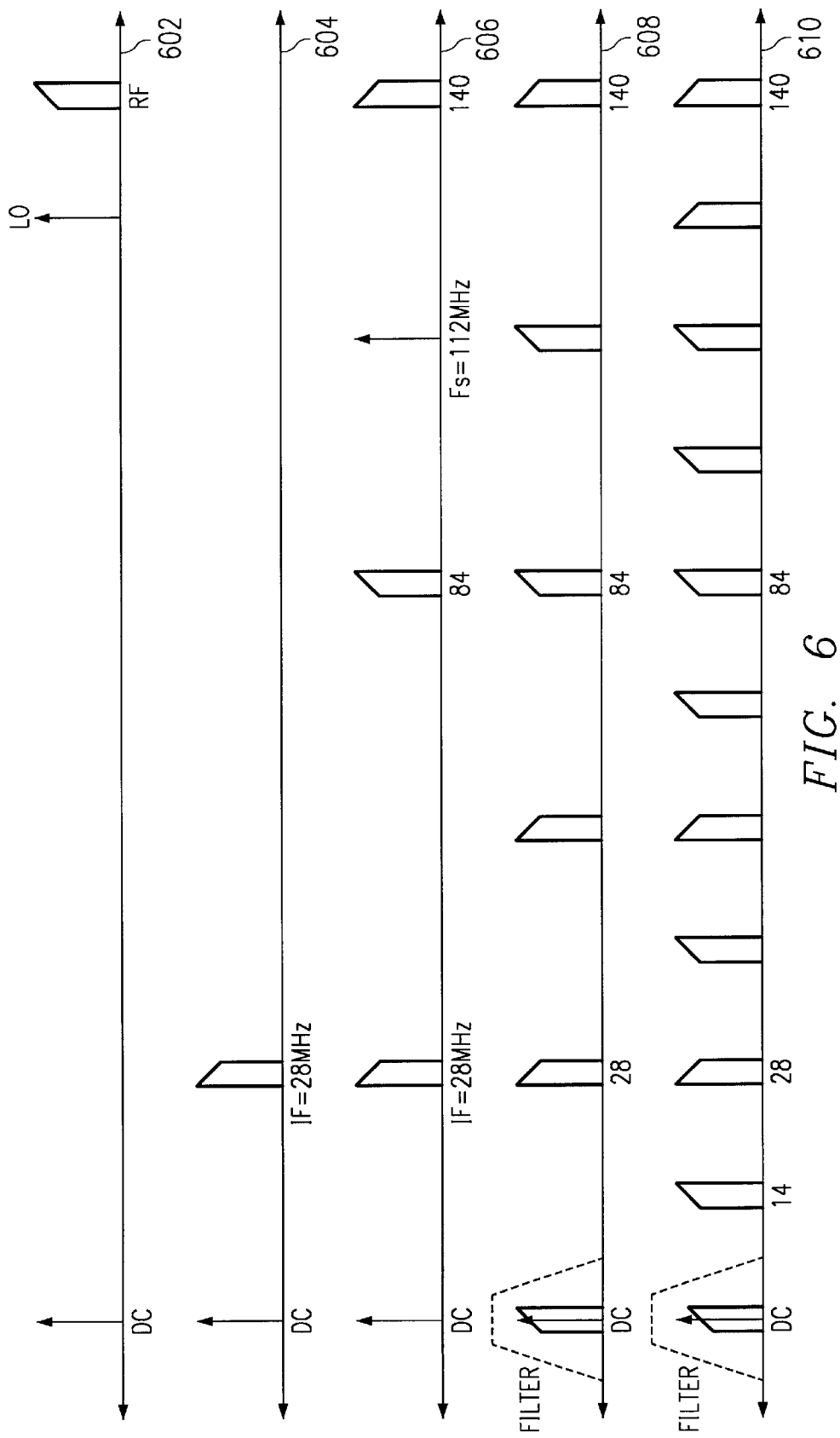

METHOD AND APPARATUS EMPLOYING DECIMATION FILTER FOR DOWN CONVERSION IN A RECEIVER

TECHNICAL FIELD

This invention relates in general to the field of radio communications and more specifically to a method and apparatus employing a decimation filter for down conversion in a receiver.

BACKGROUND

In all digital receiver architectures, the final output has to be a baseband signal in the digital domain. To get this baseband signal there are a few receiver architectures to choose from. Each of these receiver architectures has some advantages and disadvantages. It is worth noting here that for ease of discussion that only one of the paths (I or Q) are shown in FIGS. 1, 2, 3 and 5.

One of the most commonly used receiver architectures is the heterodyne receiver as shown in FIG. 1. The heterodyne receiver uses two mixers 108, 114 to down convert the RF signal 102 to baseband followed by an analog-to-digital converter (ADC) 118 to convert the signal to the digital domain. A low pass filter (LPF) 116 provides filtering of the second mixer's output signal prior to presentation to the ADC 118. The ADC 118 receives a sampling frequency signal 122 which is equal to or greater than two times the desired bandwidth (i.e., Fsample≧2*B.W.).

Also included as part of the heterodyne receiver shown in FIG. 1, is a conventional front-end filter 104 and a low noise amplifier (LNA) 106. Together the filter 104 and LNA 106 provide front-end filtering and amplification to the RF signal 102 prior to introducing the RF signal to the first mixer 108. A second filter 110 and automatic gain control (AGC) circuit 112 provide further filtering and gain control to the first IF signal prior to providing the IF signal to the second mixer 114 for down conversion. A digital decimation filter 120 decimates the digital signal in order to reduce the data rate. Heterodyne receivers, like that shown in FIG. 1 are very robust and have very good performance characteristics. However, the heterodyne receiver uses many components, and therefore requires a large amount of silicon die space to manufacture.

A second receiver architecture that is used frequently is the direct conversion receiver as shown in FIG. 2. The direct conversion receiver uses only one level mixer 508 to down convert the RF signal 202 to base-band followed by an AGC 212 and an ADC 214 to convert the signal into the digital domain. A decimating filter 216 decimates the digital signal as required. The ADC 214 and decimating filter 216 are provided a sampling frequency signal 218 having a frequency equal to or greater than two times the desired bandwidth (Fsample≧2*B.W.). Direct conversion receivers have very simple architectures so they tend to save space, cost and power consumption. However, they suffer from DC offset problems, large even order distortion, flicker noise, and LO leakage.

A third well known receiver architecture is a compromise between the heterodyne and the direct conversion receiver, where the RF signal 302 is down converted by an (local oscillator) LO using mixer 308 to a low IF frequency. This signal is then filtered and amplified through a filter 310 and automatic gain control circuit (AGC) 312 combination. The signal is then digitized through an ADC 314 operating at a sampling frequency that is a multiple (e.g., 4) of the IF frequency. At this point the signal is in the digital domain, but still centered in frequency around the IF frequency and has a data rate equal to the sampling frequency signal 320, Fsample=4*IF. A digital mixer 316 is used to down convert the digital signal to baseband. The choice of Fsample=4*IF, is very useful since the digital mixer 316 is simplified to a multiplication process with coefficients of 1, 0, −1, 0, etc. This result of the multiplication operation is shown in FIG. 4.

Note that the 1, 0, −1, 0 coefficients act as a second LO of frequency equal to the IF. The result is that the signal is down converted in the digital domain to baseband but still has a data rate equal to Fsample. To reduce the data rate, a decimation filter 318 is needed. The receiver architecture of FIG. 3 still requires a second mixer 316, but this mixer is in the digital domain, so its distortion and noise are not as critical as in the heterodyne receiver architecture. Given the above examples of prior art receiver architectures, it would be beneficial to have a receiver architecture that eliminates the need for a second mixer in the receiver in order to down convert the IF frequency to base band. By eliminating the second mixer, its associated noise, distortion and power consumption are also eliminated.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIG. 6 shows the down conversion process using the receiver architecture of FIG.

DETAILED DESCRIPTION OF THE PREFERRED EMBODIMENT

Figure 1:
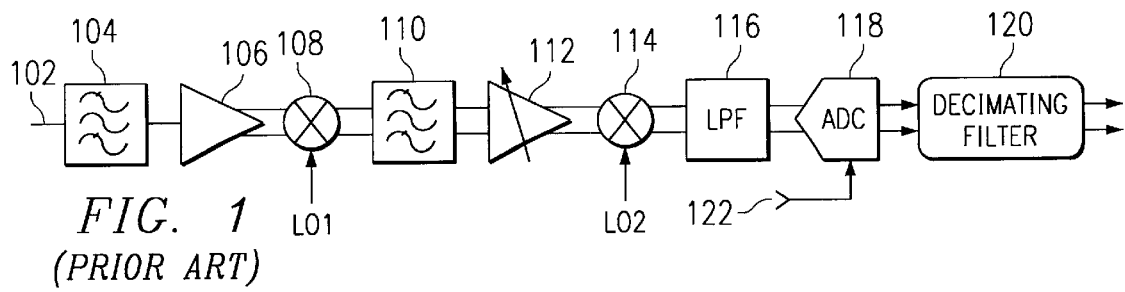
FIG. 1 shows a prior art heterodyne receiver architecture.
Figure 2:
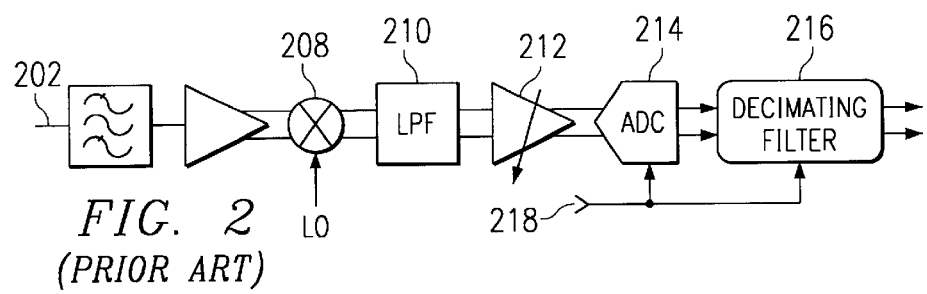
FIG. 2 shows a prior art direct conversion receiver architecture.

While the specification concludes with claims defining the features of the invention that are regarded as novel, it is believed that the invention will be better understood from a consideration of the following description in conjunction with the drawing figures, in which like reference numerals are carried forward.

Figure 3:
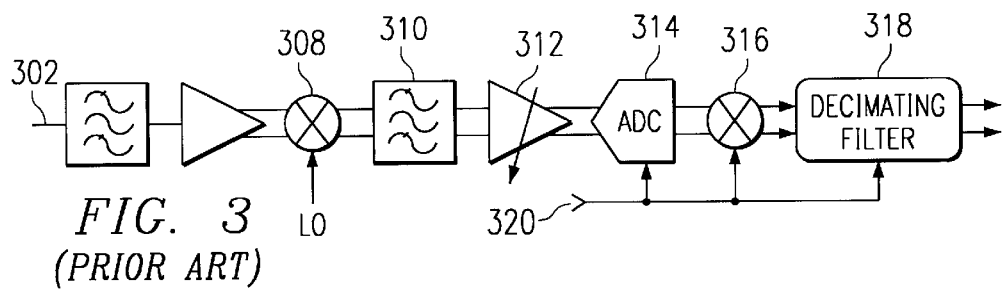
FIG. 3 shows a prior art digital mixer receiver architecture.
Figure 4:
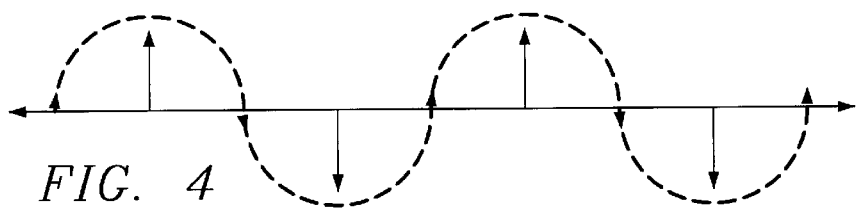
FIG. 4 shows a sampling rate for the digital mixer of FIG. 3.
Figure 5:
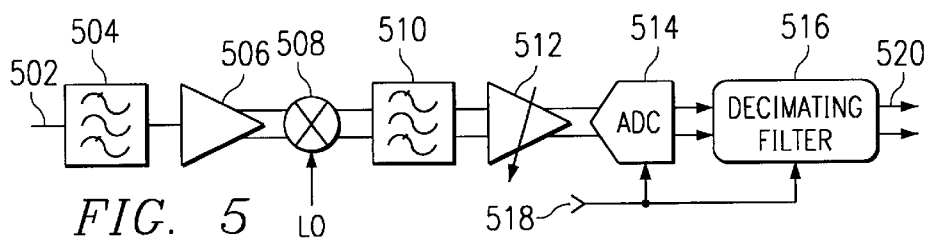
FIG. 5 shows a receiver architecture having no second mixer stage in accordance with the present invention.

Referring now to FIG. 5, there is shown a receiver architecture in accordance with the invention. The receiver architecture is similar to the digital mixer architecture shown in FIG. 3, but with a main difference, that no digital mixer is used. Instead, a proper selection of the decimation factor for decimation filter 516 is chosen to do the down conversion function without using a mixer. This will save power consumption and save surface area in the silicon die. In addition, there is no extra mixer distortion since the architecture uses the decimation filter 516 that is used in all receiver architectures to perform data rate adjustment.

In the receiver architecture of FIG. 5, the RF signal 502 is sent to a front-end filter 504 and amplifier 506 prior to being sent to mixer 508. Mixer 508 combines the LO with the amplified and filtered signal to produce a low IF frequency signal. The signal is filtered again by filter 510 and is provided automatic gain adjustment by AGC 512. The signal is then converted into the digital domain by ADC 514. The digital signal is then sent to the decimating filter 516 in order to decimate the signal and provide output signal 520.

A key idea of the invention is to preferably chose the sampling rate signal 518 provided to ADC 514 and decimating filter 516 to preferably be four times the IF frequency (Fsample=4*IF) and then use the decimation factor to be at least four. The decimation factor can also be a multiple of four, for example, 8, 16, etc. The only problem with higher decimation factors is that the decimation filter 516 that is used to remove the images will have to be a higher order filter.

In FIG. 6, there is illustrated how the down conversion process is accomplished in the frequency domain. An RF signal is mixed with an LO as shown in 602. Assuming as one example, the low IF to be at 28 MHz, the signal will be down converted to IF by mixer 508 as shown in 604, while the image is removed by the filter 510. Using a Fsample= 4*IF=112 MHz (multiple factor of 4) for signal 518, the ADC 514 will digitize the signal and due to the sampling, replicas of the spectrum will appear every Fsample as shown in 606. The decimation filter 516 uses a decimation factor of four, to resample the digital data again, thus replicas of the whole digital spectrum will appear every Fsample/4. One of these replicas is located at baseband as shown in 608. As shown in 610, a different sampling rate is used by decimating filter 516, such as Fsample/8 (a multiple of 4) can be used in the decimation filter 516 in order to decrease power consumption. However, the decimation filter that is used to clean up the desired signal at baseband from the other images will be of a higher order if the Fsample/8 sampling rate is used instead of the Fsample/4 rate for decimation filter 516.

As been shown above, by directly using a decimation filter on the digital output of an ADC, and choosing the proper sampling frequency and decimation factor, a baseband image from the IF signal is generated and all other images are filtered out without the need for a second mixer as required in the prior art receiver architectures previously discussed. This new down conversion receiver architecture eliminates the need for a second mixer to down convert the IF frequency to base band in the digital domain. By eliminating this mixer, its noise, distortion and power consumption are eliminated from the design.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A radio frequency receiver, comprising:

a mixer for receiving a radio frequency signal and a local oscillator signal and providing an output intermediate frequency (IF) signal;

an analog-to-digital converter (ADC) for receiving the IF signal and converting it into a digital signal;

a decimation filter responsive to the digital signal; and the ADC and decimation filter receive a sampling frequency signal (Fsample) which is a multiple factor of the IF frequency signal, and the decimation filter converts the digital signal provided by the ADC to a base band signal.

2. A radio frequency receiver as defined in claim 1, wherein the sampling frequency signal is four times greater than the IF.

3. A radio frequency receiver as defined in claim 1, wherein the decimation filter uses a decimation factor equal to the multiple factor or a multiple of the multiple factor.

4. A radio frequency receiver as defined in claim 3 wherein the multiple factor is equal to four.

5. A method for demodulating an RF signal, comprising the steps of:

mixing the RF signal with a local oscillator signal and providing an intermediate frequency (IF) signal;

converting the IF signal into a digital signal using an analog-to-digital converter (ADC); and decimating the digital signal using a decimation filter in order to produce a baseband signal.

6. A method as defined in claim 5, wherein the ADC and the decimation filter are provided a sampling frequency equal to the IF signal frequency times a multiple factor.

7. A method as defined in claim 6, wherein the multiple factor is equal to four.

8. A method as defined in claim 7, wherein the decimation filter uses a decimation factor equal to four.

9. A method as defined in claim 7, wherein the decimation filter uses a decimation factor equal to four or a multiple of four.

10. A method as defined in claim 6, wherein the decimation filter uses a decimation factor equal to the multiple factor or a multiple of the multiple factor.

* * * * *